(12) United States Patent
Hu et al.

(10) Patent No.: US 10,599,474 B2
(45) Date of Patent: *Mar. 24, 2020

(54) MULTI-LAYER QOS MANAGEMENT IN A DISTRIBUTED COMPUTING ENVIRONMENT

(71) Applicant: International Business Machines Corporation, Armonk, NY (US)

(72) Inventors: Yonggang Hu, Richmond Hill (CA); Zhenhua Hu, Toronto (CA); Reshu Jain, Sunnyvale, CA (US); Prasenjit Sarkar, San Jose, CA (US); Rui Zhang, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,647

(22) Filed: Jul. 9, 2018

(65) Prior Publication Data
US 2018/0314561 A1 Nov. 1, 2018

Related U.S. Application Data

(63) Continuation of application No. 15/346,517, filed on Nov. 8, 2016, now Pat. No. 10,019,290, which is a
(Continued)

(51) Int. Cl.
*G06F 9/50* (2006.01)
*H04L 12/911* (2013.01)
(Continued)

(52) U.S. Cl.
CPC .......... *G06F 9/5016* (2013.01); *G06F 9/4843* (2013.01); *H04L 47/783* (2013.01);
(Continued)

(58) Field of Classification Search
CPC ...... H04L 47/24; H04L 47/783; G06F 9/5016
See application file for complete search history.

(56) References Cited

U.S. PATENT DOCUMENTS 6,681,387 B1 1/2004 Hwu
6,965,930 B1 11/2005 Arrowood et al.
(Continued)

FOREIGN PATENT DOCUMENTS

CN 102170396 8/2011
WO 2012087767 6/2012

OTHER PUBLICATIONS

Wang, Chien-Min, et al.; Provision of Storage QoS in Distributed File Systems for Clouds; 2012 41st International Conference on Parallel Processing; Sep. 2012; pp. 189-198.
(Continued)

*Primary Examiner* — Michael A Keller
(74) *Attorney, Agent, or Firm* — James L. Baudino

(57) ABSTRACT

A technique for multi-layer quality of service (QoS) management in a distributed computing environment includes receiving a workload to run in a distributed computing environment. A workload quality of service (QoS) class for the workload is identified, and the workload QoS class is translated to a storage level QoS class. The workload is scheduled to run on a compute node of the environment, and the storage level QoS class is communicated to a workload execution manager of the compute node. The storage level QoS class is communicated to one or more storage managers of the environment where the storage managers manage storage resources in the environment. The storage managers extend the storage level QoS class to the storage resources to support the workload QoS class.

7 Claims, 4 Drawing Sheets

Related U.S. Application Data continuation of application No. 14/517,881, filed on Oct. 19, 2014, now Pat. No. 9,515,956, which is a continuation of application No. 14/474,086, filed on Aug. 30, 2014, now Pat. No. 9,521,089.

(51) Int. Cl.

| | | |
|---|---|---|
| *G06F 9/48* | (2006.01) | |
| *H04L 12/927* | (2013.01) | |
| *H04L 29/08* | (2006.01) | |
| *H04L 12/851* | (2013.01) | |

(52) U.S. Cl.
CPC ........ *H04L 47/805* (2013.01); *H04L 67/1008* (2013.01); *H04L 67/1023* (2013.01); *H04L 67/1095* (2013.01); *H04L 67/1097* (2013.01); *H04L 47/24* (2013.01)

(56) References Cited

U.S. PATENT DOCUMENTS

| | | |
|---|---|---|
| 7,092,985 B2 | 8/2006 | Hubbard |
| 7,593,948 B2 | 9/2009 | Suggs et al. |
| 7,664,847 B2 | 2/2010 | Colrain et al. |
| 7,917,903 B2 | 3/2011 | Lumb et al. |
| 8,631,154 B2 | 1/2014 | Bartfai-Walcott et al. |
| 8,732,291 B2 | 5/2014 | Zhu et al. |
| 8,849,910 B2 | 9/2014 | Inamdar et al. |
| 2006/0193280 A1 | 8/2006 | Lee et al. |
| 2010/0262687 A1 | 10/2010 | Shen et al. |
| 2012/0099428 A1 | 4/2012 | Kamdar et al. |
| 2012/0182891 A1 | 7/2012 | Lee et al. |
| 2013/0017852 A1 | 1/2013 | Liu et al. |
| 2013/0132674 A1 | 5/2013 | Sundrani |
| 2013/0322279 A1 | 12/2013 | Chincholi et al. |
| 2013/0326064 A1 | 12/2013 | Gulati et al. |
| 2014/0095691 A1 | 4/2014 | Ganguli et al. |
| 2016/0004571 A1 | 1/2016 | Smith |

OTHER PUBLICATIONS

Internet community board (https://issues.apache.org/jira/browse/HADOOP-9194); RPC Support for QoS; created Jan. 10, 2013; last updated Jul. 30, 2014.

Mohan, Subra; Use Storage QoS to Manage Performance for Multiple Workloads; Internet article (http://searchstorage.techtarget.com/NetAppSponsoredNews/Use-Storage-QoS-to-Manage-Performance-for-Multiple-Workloads); published at least as early as Jul. 1, 2013.

Zhu, Xilu, et al.; Web Service Management based on Hadoop; 2011 8th International Conference on Service Systems and Service Management (ICSSSM); Jun. 2011.

Wan, Cong, et al.; Utility-Driven Share Scheduling Algorithm in Hadoop; ISNN 2013 Proceedings of the 10th International Conference on Advances in Neural Networks; vol. Part II; pp. 560-568; Jul. 2013.

Adaptive Computing Enterprises, Inc.; Moab Workload Manager, Administrator Guide 7.2.9; Sep. 2014.

Kaushik, Rini T., et al.; GreenHDFS: Towards An Energy-Conserving, Storage-Efficient, Hybrid Hadoop Compute Cluster; Proceedings of the 2010 International Conference on Power Aware Computing and Systems; Oct. 2010.

List of IBM Patents or Patent Applications Treated as Related.

MULTI-LAYER QOS MANAGEMENT IN A DISTRIBUTED COMPUTING ENVIRONMENT

BACKGROUND

In cluster computing or in a distributed computing environment, a compute cluster is a set of computers connected over a network with resource usage within the cluster coordinated by a workload or resource manager. Typically, a user submits a job (a request to run an instance of an application) to the resource manager. The resources required to run the job may be specified by the user with the job submission or allocated as needed by the resource manager. The resource manager assigns idle resources to the job when available, and runs the job.

The workload of each compute cluster may be managed by a workload scheduler. In some cases, a resource may be shared among multiple independent clusters. Thus, certain resources may need to be allocated across the different compute clusters of the organization. In distributed application scenarios, the application may be data-intensive and compute-intensive. For example, applications are often hosted in a multi-tenancy environment where distributed computers, network, and storages are shared by other applications so as to minimize infrastructure and management costs. Some of these application may also have constraints such as response times, such as interactive or near real-time decision making applications used in stock purchases and personalized recommendations for mobile device users.

BRIEF SUMMARY

According to one aspect of the present disclosure a method and technique for multi-layer quality of service (QoS) management in a distributed computing environment is disclosed. The method includes receiving a workload to run in a distributed computing environment. A workload quality of service (QoS) class for the workload is identified, and the workload QoS class is translated to a storage level QoS class. The workload is scheduled to run on a compute node of the environment, and the storage level QoS class is communicated to a workload execution manager of the compute node. The storage level QoS class is communicated to one or more storage managers of the environment where the storage managers manage storage resources in the environment. The storage managers extend the storage level QoS class to the storage resources to support the workload QoS class.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
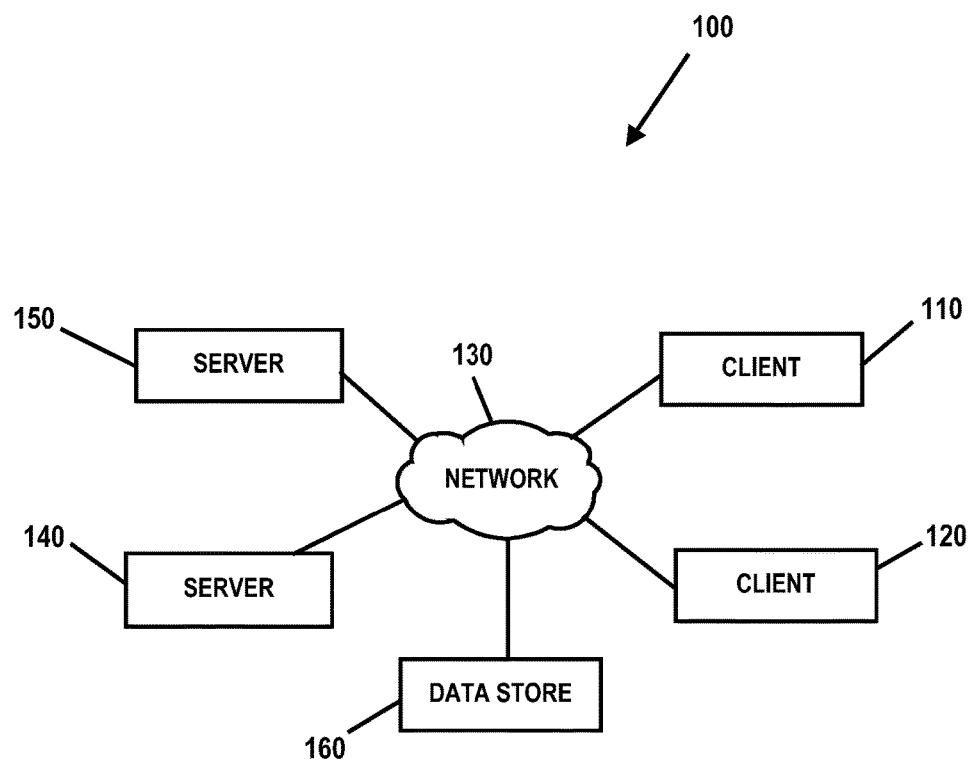
FIG. 1 is an embodiment of a network of data processing systems in which the illustrative embodiments of the present disclosure may be implemented.

Embodiments of the present disclosure provide a method, system and computer program product for multi-layer QoS management in a distributed computing environment. Embodiments of the present disclosure are configured to dynamically manage and classify workload and storage QoS across compute, network and storage layers for data- and compute-intensive applications running in distributed computing environment. For example, QoS settings are identified and mapped to various resource managers of the various layers of the environment for extending such QoS settings to respectively controlled layer resources. Embodiments of the present disclosure also proactively adjust QoS settings in various layers of the environment for various QoS classes according to workload scheduling policies and demands. Embodiments of the present disclosure may also schedule workloads and accommodate data read/write requests to avoid and/or alleviate hot spots of a storage QoS class. Thus, for example, in some embodiments, the method and technique includes: receiving a workload to run in a distributed computing environment; identifying a workload quality of service (QoS) class for the workload; translating the workload QoS class to a storage level QoS class; scheduling the workload to run on a compute node of the environment; communicating the storage level QoS class to a workload execution manager of the compute node; communicating the storage level QoS class to one or more storage managers of the environment, the storage managers managing storage resources in the environment; and extending, by the storage managers, the storage level QoS class to the storage resources to support the workload QoS class.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
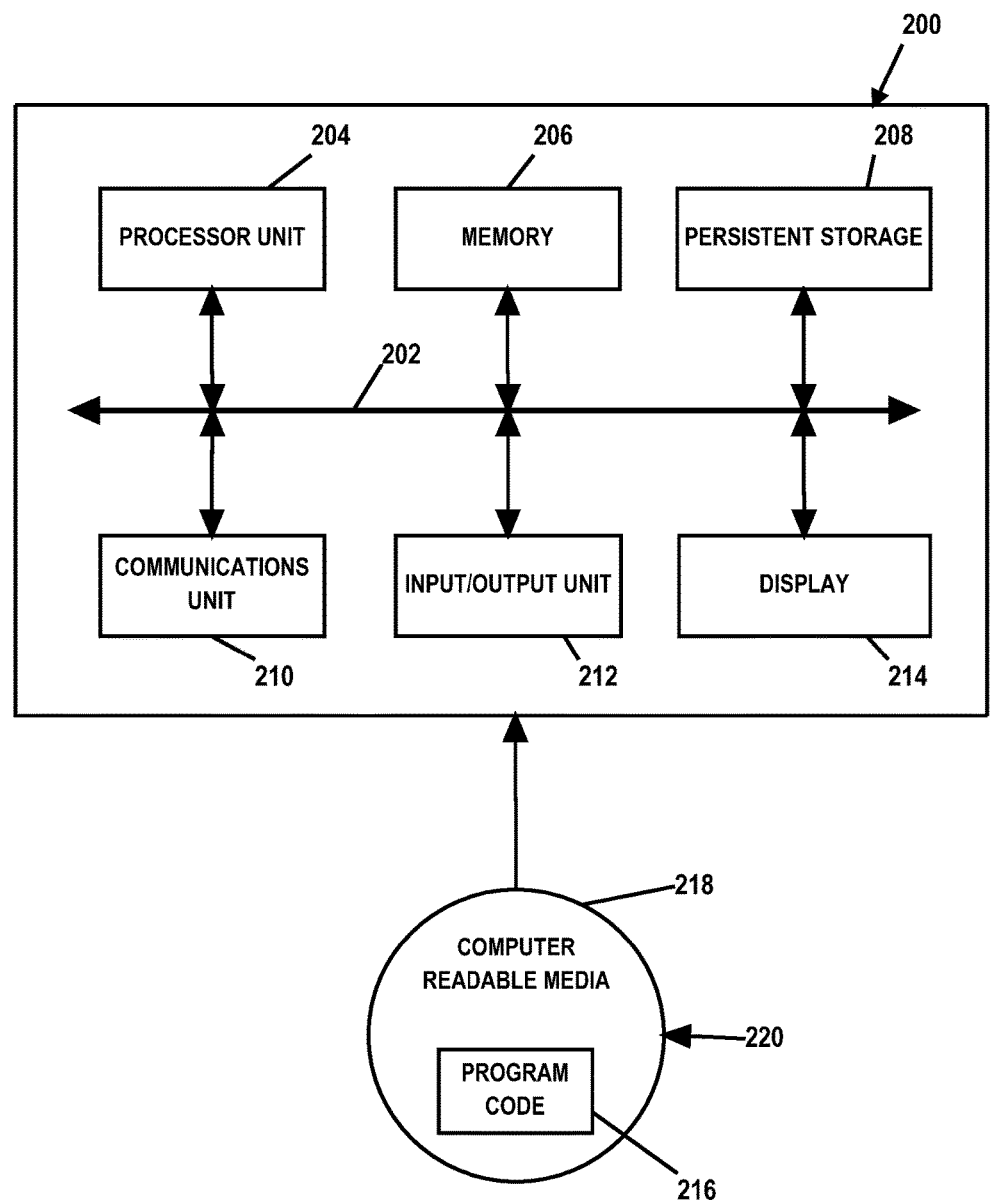
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for multi-layer QoS management in a distributed computing environment according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
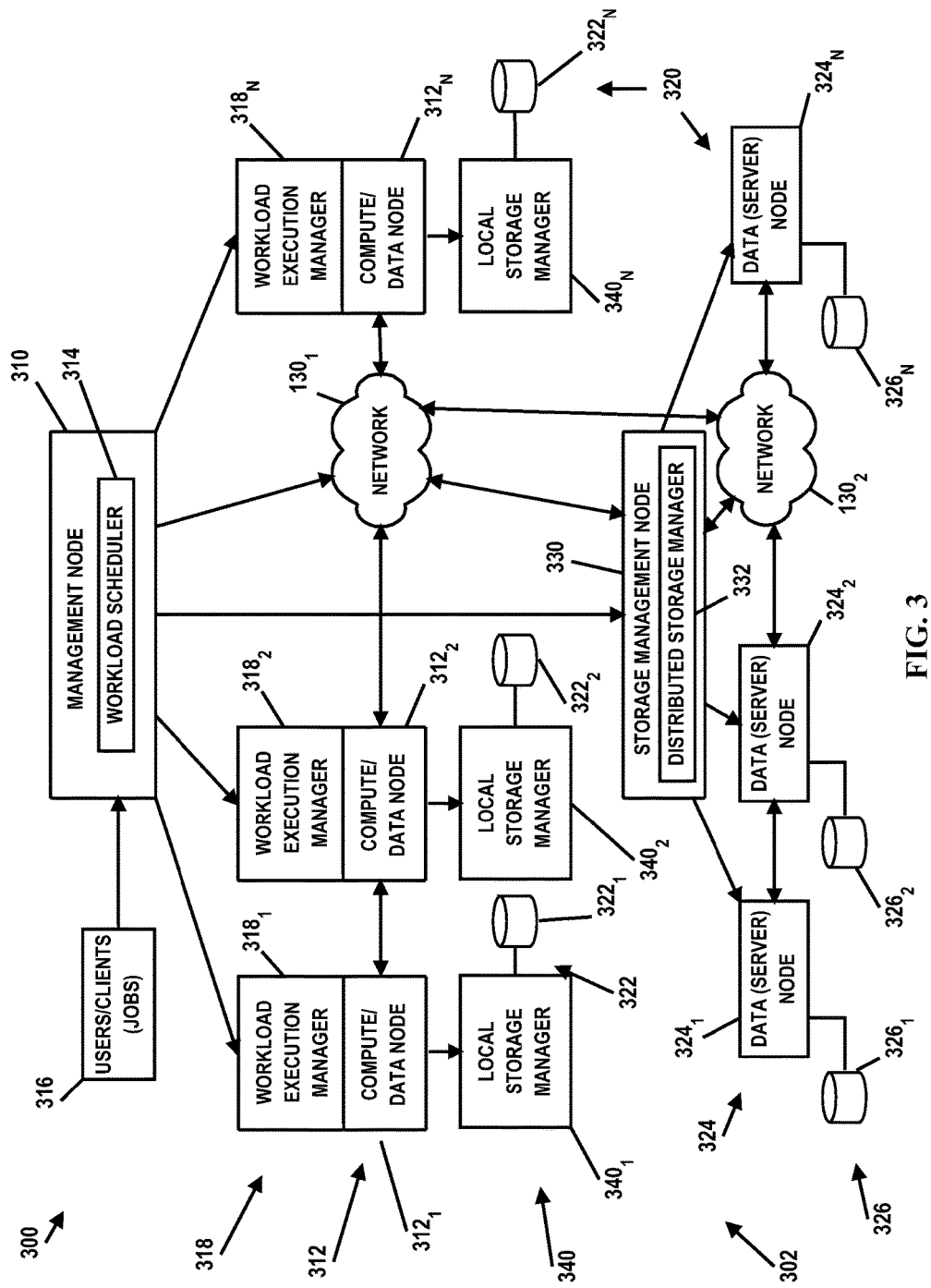
FIG. 3 is a diagram illustrating an embodiment of a distributed computing environment in which illustrative embodiments of a system for multi-layer quality of service (QoS) management in a distributed computing environment according to the present disclosure may be implemented.

FIG. 3 is an illustrative embodiment of a system 300 for multi-layer QoS management in a distributed computing environment (e.g., a clustered computing environment). Various components or nodes of system 300 may be implemented on data processing systems or platforms such as, but not limited to, servers 140 and/or 150, clients 110 and/or 120, or at other data processing system locations. In FIG. 3, system 300 illustrates an exemplary computing architecture 302 where a plurality of data processing nodes are configured to communicate with one another and/or share resources across the computing environment. Each node may include one or more linked machines or "hosts" which are configured to provide resources such as CPU time, memory, database storage, software licenses, and computing capabilities. A host may be any machine capable of providing resources, such as a personal computer (PC), a server, or other type of computing device.

In the embodiment illustrated in FIG. 3, system 300 includes a management node 310 and compute/data nodes 312 (e.g., compute/data nodes $312_1$-$312_n$). Management node 310 includes a workload scheduler 314 that is configured to receive workloads from one or more clients/users 316. In the illustrated embodiment, a single management node 310 with a single workload scheduler 314 is depicted; however, it should be understood that multiple management nodes 310 may be employed each with one or more workload schedulers 314. Workload scheduler 314 may evaluate submitted workloads and perform various resource scheduling and allocation decisions for executing/processing the workloads. For example, workload scheduler may manage the resources in the cluster, including compute resources (e.g. CPU and memory), storage resources, and network resources, and schedule the workloads to run on compute/ data nodes 312. Each compute/data node 312 may also comprise a workload execution manager 318 (e.g., workload execution managers $318_1$-$318_n$) that performs various resource scheduling and allocation decisions local to a respective compute/data node 312 for running or executing workloads. Workload scheduler 314 and/or workload execution manager 318 may be implemented in any suitable manner using known techniques that may be hardware-based, software-based, or some combination of both. For example, workload scheduler 314 and/or workload execution manager 318 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In FIG. 3, system 300 also includes a distributed storage system 320 including local data stores 322 (e.g., local data stores $322_1$-$322_n$) associated with respective compute/data nodes 312, and data server nodes 324 (e.g., data server nodes $324_1$-$324_n$) each having available data stores 326 (e.g., data stores $326_1$-$326_n$) that may be optionally dedicated. A storage management node 330 includes a distributed storage manager 332 that manages shared storage via the local storage (e.g., local data stores 322) through a local storage manager 340 on respective compute/data node 312 (e.g., local storage managers $340_1$-$340_n$) and via data stores 326 through respective data server nodes 324. Storage manager 332, by coordinating with local storage managers 340, provides a global picture of a single storage system to serve data read/write requests on the local and shared storages for jobs and tasks. Storage manager 322 may be implemented in any suitable manner using known techniques that may be hardware-based, software-based, or some combination of both. For example, storage manager 322 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

One or more networks 130 (e.g., networks $130_1$ and $130_2$) connect the nodes in the cluster. For data connections, a network (e.g., network $130_1$) may connect each compute/ data node 312 so that nodes 312 can exchange data among each other. There may also be a network (e.g., network $130_2$) connecting compute/data nodes 312 to the dedicated data server nodes 324 to read/write data in the shared data stores 326. Another network (e.g. a storage area network (SAN)) among the dedicated data server nodes 326 to accommodate high performance data replication and striping.

Embodiments of the present disclosure enable the dynamical management and classification of workload and storage QoS across compute, network and storage layers for applications running in a distributed computing environment. Embodiments of the present disclosure further provide consistent and collaborative QoS classification and mapping so that the classification and isolation are performed in a coordinated and effective fashion, despite the heterogeneous specifics amongst system components. For example, the sharing of resources in a distributed computing environment may create complex resource interference and contention scenarios, thereby making it difficult to provide desired QoS for high priority applications requiring interactive or near real-time decision processes. For example, workloads of interactive applications require fast responses to users in the range of seconds.

The QoS of a resource (e.g., network or storage) is usually represented as a class, policy tag, or priority number provided by a resource manager (e.g. a file system) to the application workload layer for controlling what performance criteria the resource layer should deliver to a workload in terms of resource scheduling priority, input/output operations per second (TOPS), bandwidth, latency guarantee, limit, etc. According to the present disclosure, on top of the resource layer, such classification can also be managed in the workload management layer so that a high-level QoS in terms of priority, bandwidth/throughput isolation or limits, and latency requirements for different workloads can be consistently specified, translated and propagated from the workload scheduler 314 into resource managers/controllers in a distributed computing environment. Accordingly, the resource layer thereby provides the required QoS support for these workloads, often using exiting actuators available at different resources such as CPU, memory, cache, storage input/output (I/O) and/or network I/O.

A workload can be either a service workload, or a job, or a task in a job. A service workload submitted from a user/client 316 may comprise a long running or always running software program such as a web server or a database server. Compared to a service workload, a job or a task has relatively short life cycle. A job submitted from a user/client 316 can include multiple groups of tasks. Tasks in a group have the same resource and QoS requirements that can be specified either in an application configuration profile or in the job submission command line. Examples of QoS requirements can be high/medium/low data throughputs or bandwidths, high/medium/low latency requirements, and/or different priorities or business importance. Tasks among groups may also have data and/or execution dependencies or dependencies among work steps or activities in a workflow job. Different jobs or different groups of tasks in a job may have different QoS requirements with given QoS classes (e.g., one may require high data throughput/bandwidth, but is fine with high latency while another may require low latency, but is fine with low data throughput/bandwidth).

In operation in response to obtaining a QoS requirement or class of a workload (e.g., from either a command line or configuration), workload scheduler 314 translates the QoS requirement into a corresponding QoS class for each involved resource layer, such as storage and/or network, according to the configurations in the systems. Also, since distributed storage system 320 controls the internal network 130 within the storage system 320, the distributed storage manager 332 and local storage manager 340 set necessary network QoS classes in the internal network 130 according to the storage QoS class requested by workload scheduler 314. For example, storage QoS classes can be set through an ionice, cgroups or other type of command (e.g., depending on the operating system). Network QoS classes can be set through traffic controller (tc) commands as well as various network software commands, protocols or configurations provided from different network vendors.

Embodiments of the present disclosure also proactively adjust QoS settings (e.g., reserved resources such as buffer sizes, bandwidths, priorities, tokens, etc.) for various QoS classes/zones/bands according to workload demands. For example, to guarantee a QoS for various application workloads, some resources such as memory buffers, bandwidths and token bucket sizes are reserved for various QoS classes/zone/bands (e.g., high/medium/low throughputs or latencies). Since resources in network and storage layers are valuable, reserving such resources all the time on every data node and network switch may not result in efficient utilization of such resources. If idle resources of a certain class may be freely used by workloads of any other classes in any order, these idle resources are not well managed regarding to the high level workload scheduling policies. Embodiments of the present disclosure enable end-to-end QoS management between workload scheduling and resource layers. For example, workload scheduler 314 is aware of what workloads are running and pending in a cluster, what data nodes or a group of nodes are used or will be used by workloads of an application based on the workload scheduling policies and execution calendar or time windows. According to scheduling information and policies, workload scheduler 314 instructs the resource managers in the storage and network layers to dynamically set, change, or free up these resources and adapt the settings of various QoS classes/zones/bands in a workload-driven fashion. For example, when there is no current and pending workload for a QoS class/zone/band, the workload scheduler 314 can instruct the resource manager (e.g., distributed storage manager 332) to free up reserved resources from this QoS class/zone/band so that the resources can be well managed and allocated to other QoS classes/zones/bands that have current and pending workloads according to the high level workload scheduling policies.

Embodiments of the present disclosure also intelligently schedule workloads and accommodate data read/write requests to avoid or alleviate hot spots of a storage QoS class. For example, in distributed environments, a data block or file may be replicated on multiple data nodes for parallel access performance and fault tolerance. A data access hot spot may be caused on a data node if too many workloads need to read and/or write data on this node in the same QoS class, or if the overall performance of a data node is bogged down for various reasons. A hot spot is related to a node, or even a network switch node. The hot spot may also be related to a specific QoS class or all the QoS classes on the node. Placing new loads on a hot spot node may slow down not only the new loads but also the existing loads.

In response to detecting a hot spot node by storage managers 332 or 340, the hot spot can be used by the storage layer to accommodate data read requests with other data nodes that have the replicas of the requested data. For example, if a data block is being written, the storage layer (e.g., storage managers 332 or 340) can avoid this hot spot node when choosing which nodes to write and replicate the data block. The hot spot information can also be used by workload scheduler 314 to avoid a hot spot node, but use other nodes with the same replicas when doing data-locality-aware scheduling, or even defer scheduling some workloads that have to use the hot spot node. The storage layer (e.g., storage managers 332 or 340) and workload scheduler 314 will make these decisions according to whether a hot spot is just specific to a QoS class or all the QoS classes on a node. After a hot spot node has been cooled down, the node can be used as a normal node again by the storage layer and workload scheduler 314. Further, if a data block is frequently read and highly demanded by the current and pending workloads which cause or may potentially cause hot spots in a QoS class, workload scheduler 314 and storage managers 332 and/or 340 work together to automatically increase replicas of this data block. Alternatively, hot spots can also be alleviated for selected QoS classes by sacrificing the performance of some other QoS classes sharing the same hot spot. The QoS classes selected for protection may have higher priority/importance or be more latency sensitive than the QoS classes chosen for sacrifice. In one embodiment, I/O requests from the sacrificed QoS classes may be rate-limited so as to ease the load on the hot spot.

In operation, QoS classes/priorities are defined at the application/workload levels (e.g., batch/throughput (reliable, large data volume), interactive (<10 s latency, pause and run spikes, small data exchanges), real-time (as soon as possible, streaming), etc.). Workload scheduler 314 maps the high-level application/workload QoS classes/priorities to the low-level storage and/or network level QoS classes/priorities which are managed and controlled by local storage managers 340 and/or distributed storage manager 332. These low-level QoS classes/priorities can be set via command line or application programming interfaces of storage managers or operating systems such as ionice, cgroups, traffic controller (tc), etc. The low-level QoS classes/priorities are extended by distributed storage manager 332 to data server nodes 324 and by local storage managers 340 for corresponding data stores 322 to support distributed and local block storages so that distributed storage manager 332 and local storage manager 340 can extract the settings of low-level QoS classes/priorities for distributed block storage from the operating system. Based on the settings for the distributed block storages, distributed storage manager 332 and/or local storage managers 340 can manage and control QoS of the distributed storage systems 320 as well as the storage network inside the system 320.

In response to workload scheduler 314 scheduling a workload to run in the cluster (e.g., by one or more compute/data nodes 312), workload scheduler 314 translates the workload's QoS classes/priorities to the storage/network level QoS classes/priorities, and then passes the storage/network level QoS classes/priorities to workload execution managers 318 on respective compute/data nodes 312, as well as to distributed storage manager 332 if needed. Workload execution managers 318 further pass the storage/network level QoS classes/priorities to respective local storage managers 340.

Workload scheduler 314 also checks the QoS requirements of currently pending and running workloads and communicates to distributed storage manager 332 the number of running workloads in the cluster and the number of pending workloads that are in workload queues for specified QoS classes. Distributed storage manager 332 and/or local storage managers 340 adjust/re-adjust reserved resource distributions among different QoS classes on demand (e.g., in response to instructions received from workload scheduler 314 based on workload scheduling policies and demands).

Distributed storage manager 332 and/or local storage managers 340 assign disk I/O bandwidth allocation and/or cache sizes to storage I/O streams from different QoS classes. According to the QoS classes of tags, for example, storage I/O streams with higher priority QoS classes are given more disk bandwidth allocation and/or cache sizes. The storage I/O streams of low priority QoS classes can be rate-limited on their I/O bandwidth and cache sizes.

Distributed storage manager 332 and/or local storage managers 340 also monitor for hot spots (i.e., heavily loaded nodes, heavily loaded QoS classes, frequently accessed data blocks) in storage/network layers. In response to detecting a hot spot by distributed storage manager 332 and/or local storage managers 340, distributed storage manager 332 and/or local storage managers 340 report the hot spots to workload scheduler 314. Workload scheduler 314 then schedules workloads to avoid hot spots. Workload scheduler 314 may inform distributed storage manager 332 and/or local storage managers 340 which workloads/jobs/tasks have been rescheduled to other nodes. Distributed storage manager 332 and/or local storage managers 340 may also replicate data blocks to non-hot spots nodes where the newly re-created workloads/jobs/tasks will be run. Distributed storage manager 332 and/or local storage managers 340 may also move some resources from less loaded nodes and QoS classes to heavily loaded nodes and QoS classes.

Figure 4:
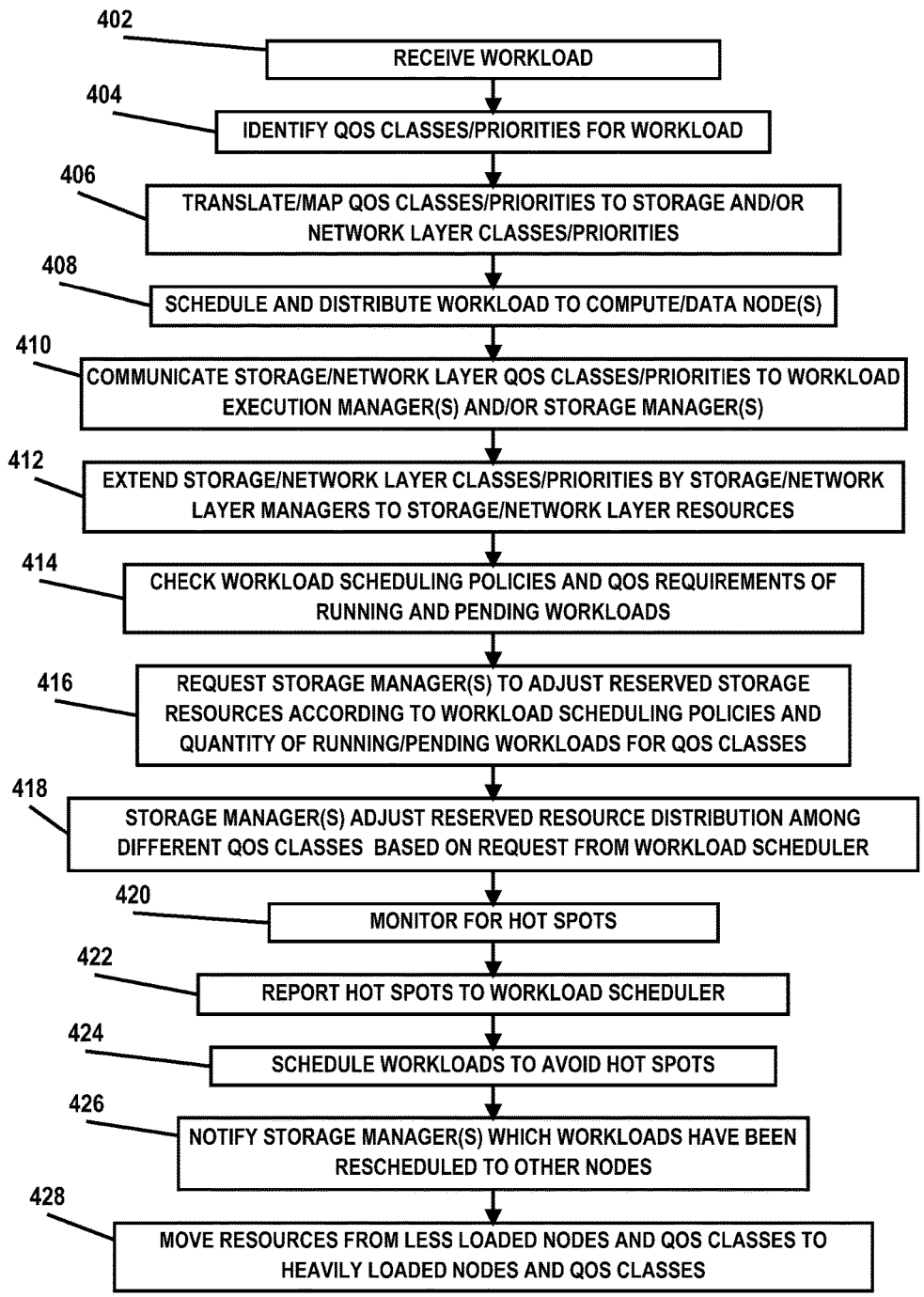
FIG. 4 is a flow diagram illustrating an embodiment of a method for multi-layer quality of service (QoS) management in a distributed computing environment according to the present disclosure.

FIG. 4 is a flow diagram illustrating an embodiment of a method for multi-layer QoS management in a distributed computing environment. The method begins at block 402, where workload scheduler 314 received a workload from a user/client 316. At block 404, workload scheduler 314 identifies workload QoS classes/priorities for the workload (e.g., batch/throughput (reliable, large data volume), interactive (<10 s latency, pause and run spikes, small data exchanges), real-time (as soon as possible, streaming), etc.). At block 406, workload scheduler 314 translates and/or maps the workload QoS classes/priorities to the storage and/or network level QoS classes/priorities. At block 408, workload scheduler 314 schedules and distributes the workload to respective compute/data nodes 312. At block 410, workload scheduler 314 communicates/transmits the storage/network layers QoS classes/priorities to workload execution managers 318 of respective compute/data nodes 312 as well as to distributed storage manager 332, and workload execution managers 318 communicate/transmit the storage/network layers QoS classes/priorities to respective local storage managers 340.

At block 412, distributed storage manager 332 and/or local storage managers 340 extend the storage/network layers QoS classes/priorities to respective distributed storage/network layer resources (e.g., data stores 322, network 130$_2$, data server nodes 324, etc.). At block 414, workload scheduler 314 checks the workload scheduling policies and QoS requirements of currently pending and running workloads. At block 416, workload scheduler 314 requests distributed storage manager 332 and/or local storage managers 340 to adjust reserved storage resources according to the workload scheduling policies and the number of running workloads in the cluster and the number of pending workloads that are in workload queues for various QoS classes. At block 418, distributed storage manager 332 and/or local storage managers 340 adjust/re-adjust reserved resource distributions among different QoS classes based on requests from the workload scheduler according to workload scheduling policies and demands. For example, distributed storage manager 332 and/or local storage managers 340 may redistribute/reallocate disk I/O bandwidth and/or cache sizes to storage I/O streams from different QoS classes.

At block 420, distributed storage manager 332 and/or local storage managers 340 monitor for hot spots (i.e., heavily loaded nodes, heavily loaded QoS classes, frequently accessed data blocks) in storage/network layers. At block 422, distributed storage manager 332 and/or local storage managers 340 notify workload scheduler 314 of detected hot spots. At block 424, workload scheduler 314 schedules/re-schedules workloads to avoid hot spots. At block 426, workload scheduler 314 informs/notifies distributed storage manager 332 and/or local storage managers 340 which workloads/jobs/tasks have been rescheduled to other nodes. At block 428, distributed storage manager 332 and/or local storage managers 340 may move some resources from less loaded nodes and QoS classes to heavily loaded nodes and QoS classes. Distributed storage manager 332 and/or local storage managers 340 may also replicate data blocks to non-hot spots nodes where the newly re-created workloads/jobs/tasks will be run.

Thus, as indicated above, interactive and batch workloads of data-intensive applications store a majority of data in distributed storage systems, retrieve the data from memory on compute nodes cross-network, analyze the data in CPU, and then either send the results back to interactive users or write the results back to the distributed storage systems cross-network. Therefore, embodiments of the present disclosure are configured to dynamically manage and classify workload and storage QoS across compute, network and storage layers for data- and compute-intensive applications running in distributed computing environment with consistent and collaborative QoS classification and mapping across the different layers of the environment so that the classification and isolation are done in a coordinated and effective fashion. Embodiments of the present disclosure also proactively adjust QoS settings of reserved resources in various layers of the environment for various QoS classes/zones/bands according to workload scheduling policies and demands, and schedule workloads and accommodate data read/write requests to avoid and/or alleviate hot spots of a storage QoS class.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   receiving a workload to run in a distributed computing environment;
   identifying a workload quality of service (QoS) class for the workload;
   translating the workload QoS class to a storage level QoS class;
   scheduling the workload to run on a compute node of the environment;
   communicating the storage level QoS class to a workload execution manager of the compute node;
   communicating the storage level QoS class to one or more storage managers of the environment, the storage managers managing storage resources in the environment;
   extending, by the storage managers, the storage level QoS class to the storage resources to support the workload QoS class;
   monitoring, by the storage managers, for hot spots, wherein the hot spots indicate increased loading with particular QoS classes; and
   replicating, by the storage managers, data to non-hot spots.

2. The method of claim 1, wherein communicating the storage level QoS class to one or more storage managers of the environment comprises:
   communicating the storage level QoS class by the workload execution manager to a local storage manager, the local storage manager managing a storage resource local to the compute node; and
   communicating the storage level QoS class to a distributed storage manager, the distributed storage manager managing non-local, distributed storage resources relative to the compute node.

3. The method of claim 1, further comprising:
   checking QoS requirements for running and pending workloads; and
   notifying the storage managers of a quantity of running and pending workloads associated with a particular QoS class.

4. The method of claim 3, further comprising adjusting reserved storage resource allocation by the storage managers based on workload scheduling policies and resource demands as indicated by the quantity of running and pending workloads associated with the particular QoS class.

5. The method of claim 1, further comprising:
   notifying, by the storage managers, a workload scheduler of the hot spots; and
   scheduling, by the workload scheduler, workloads to avoid the hot spots.

6. The method of claim 1, further comprising:
   notifying, by the storage managers, a workload scheduler of the hot spots; and
   deferring, by the workload scheduler, scheduling of workloads that will use the hot spots.

7. The method of claim 1, further comprising causing, by the storage managers, workloads to use data replicated to the non-hot spots instead of the data of the hot-spots.

* * * * *